United States Patent [19]

Namiki

[11] 4,057,762

[45] Nov. 8, 1977

[54] DEVICE FOR PHASE SYNCHRONIZING A REPRODUCED REFERENCE CARRIER SIGNAL WITH WINDOWS SPECIFIED FOR PRESELECTED ONES OF AMPLITUDE AND PHASE MODULATED SIGNAL POINTS

[75] Inventor: Junji Namiki, Tokyo, Japan

[73] Assignee: Nippon Electric Company, Ltd., Tokyo, Japan

[21] Appl. No.: 753,143

[22] Filed: Dec. 21, 1976

[30] Foreign Application Priority Data

Dec. 26, 1975 Japan .................................. 50-158851

[51] Int. Cl.² .............................................. H03D 5/00
[52] U.S. Cl. ...................................... 329/50; 325/346; 329/124; 329/135
[58] Field of Search ................. 329/50, 122, 124, 126, 329/135; 325/346, 419

[56] References Cited

U.S. PATENT DOCUMENTS

| | | | |
|---|---|---|---|
| 3,806,815 | 4/1974 | Fletcher et al. ................. | 329/122 X |
| 3,970,946 | 7/1976 | Matsuo ............................ | 329/135 X |

*Primary Examiner*—Siegfried H. Grimm
*Attorney, Agent, or Firm*—Sughrue, Rothwell, Mion, Zinn and Macpeak

[57] ABSTRACT

A phase synchronizer for a reference carrier signal reproduced in a receiver for a combined amplitude and phase modulated signal comprises a window specifier for specifying windows for preselected ones of true signal points of which the demodulated signal is selectively representative. The phase synchronizer includes a demodulator for producing complex signals representative of coarse signal points so long as the reproduced carrier signal has a phase error which falls within the windows. Differences between the true points and the coarse points falling within the windows are calculated and summed up to produce a control signal for reducing the phase error substantially to zero.

5 Claims, 5 Drawing Figures

DEVICE FOR PHASE SYNCHRONIZING A REPRODUCED REFERENCE CARRIER SIGNAL WITH WINDOWS SPECIFIED FOR PRESELECTED ONES OF AMPLITUDE AND PHASE MODULATED SIGNAL POINTS

BACKGROUND OF THE INVENTION

This invention relates to a phase synchronizer or synchronizing device for use in phase synchronizing a reference carrier signal indispensable in demodulating in a receiver a combined amplitude and phase modulated signal derived by quadrature modulation of those codes which are assigned to a plurality of signal points, N in number, arranged on an X-Y complex amplitude plane.

As a polyphase modulation system wherein a finite number of those signal points are defined on an X-Y complex amplitude plane which are assigned to codes to be selectively transmitted on a reference and a quadrature carrier signal, a system is already known wherein the signal points are arranged on the circumference of a circle as described by William R. Bennett and James R. Davey in detail in a book, *Data Transmission*, published in 1965 by McGraw-Hill Book Co., Inc. As set forth at pages 201-209 of the referenced book, use may be made, in carrying out the demodulation, of differential phase detection for which it is unnecessary to reproduce or recover the reference carrier signal. This is unnecessary because the transmitted signal includes no amplitude information.

With a recent improvement in the quality of transmission channels, combined amplitude and phase modulation systems have come into practical use wherein the positions of the signal points are no longer restricted to the circumference of a circle but are arranged optionally as disclosed by D.N. McRae in "Performance Evaluation of a New Modulation Technique," published in *IEEE Transactions on Communication Technology*, Vol. COM-19, No. 4 (August 1971) at pages 431-445. For this system wherein the transmitted codes have both phase and amplitude information, it is mandatory in a receiver to reproduce a reference carrier signal for use in demodulating the transmitted codes. In the receiver, a quadrature carrier signal is also produced by shifting the phase of the reproduced carrier signal by ninety degrees. These two carrier signals are multiplied by the amplitude and phase modulated signal to provide first and second products, respectively. Based on the principles of coherent detection, the first and second products provide X (real) and Y (imaginary) components of the modulation signal. A demodulator for such demodulation is known as a quadrature phase and amplitude demodulator. This system has problems in reproduction of the reference carrier signal, namely, difficulties in detecting a phase difference between the reproduced carrier signal and an incoming reference carrier signal implicitly contained in the modulated signal supplied to the receiver. In other words, this system requires in the receiver a complex phase error detector like the carrier phase detector illustrated in FIG. 4 on an article contributed by T. Furuya et al to the Third International Conference on Digital Satellite Communication, November 1975, entitled "C-3 Hybrid Modem for 120 Channels FDM Telephony Signal Transmission" (pages 91-98).

SUMMARY OF THE INVENTION

It is therefore an object of the present invention to provide a phase synchronizing device which is for use in a receiver for an amplitude and phase modulated signal and is simple in structure.

In accordance with this invention, there is provided a phase synchronizing device for use in a receiver for an incoming amplitude and phase modulated signal selectively representative of true signal points $(X_i, Y_i)$, N in number, arranged on an X-Y complex amplitude plane. The phase synchronizing device is for phase synchronizing a reproduced reference carrier signal with an incoming reference carrier signal defining the X-Y plane and contained implicity in the incoming modulated signal. The phase synchronizing device comprises a demodulator responsive to the incoming modulated signal and the reproduced carrier signal for producing complex signals selectively representative of coarse signal points $(X_i', Y_i')$ distributed on the X-Y plane around the true points, a window specifier responsive to the complex signals for producing window signals defining those predetermined areas on the X-Y plane which include preselected ones of the true points, $n$ in number where $n$ is not greater than N, means responsive to the complex signals and the window signals for producing difference signals representative of differences $(x_i, y_i)$ in X and Y components between the true points and the coarse points included in the areas, and means for calculating a linear sum of the differences, $p$ in number, in the X components and the difference, $q$ in number, in the Y components to produce a sum signal representative of the sum, where $p$ and $q$ are not greater than $n$ and not simultaneously equal to zero. The phase synchronizing device further comprises means responsive to the sum signal for phase controlling the reproduced carrier signal.

DESCRIPTION OF THE PREFERRED EMBODIMENTS

Figure 1:
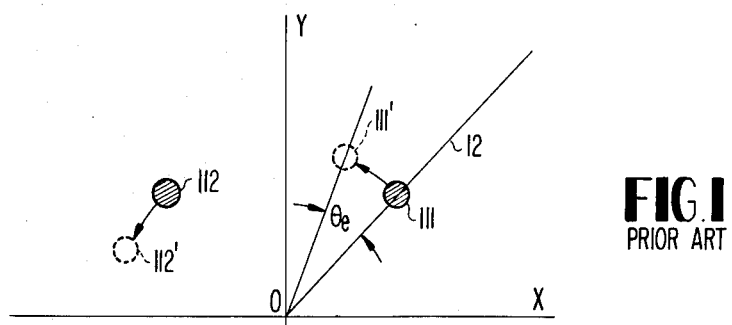
FIG. 1 shows an X-Y complex amplitude plane for a conventional four-phase modulation system.

Referring to FIG. 1, a conventional four-phase modulation system will be described at first for a better understanding of the present invention. Four signal points 111, 112, 113 and 114 are depicted on an orthogonal X-Y complex amplitude plane having an origin O. It may be understood that the illustrated X-Y plane is defined by an incoming reference carrier signal implicitly contained in an incoming four-phase modulated signal at a receiver of the system. When a reference carrier signal reproduced in the receiver lags behind the incoming carrier signal by a phase error $\theta_e$, the points 111-114 are undesirably shifted counterclockwise by an angle equal to the phase error $\theta_e$ around the origin O to signal points 111', 112', 113' and 114'. The points 111–114 are herein called true signal points, which correctly represent information being transmitted. The undesirable shifted points 111' – 114' will be called coarse signal points. With a conventional phase synchronizing device (not shown), the angle $\theta_e$ between the true points 111–114 and the coarse points 111' – 114' is inferred in one way or another. For instance, the angle $\theta_e$ is deduced from the coarse point 111' by detecting the side on which the coarse point 111' is placed relative to a straight line 12 passing through the true point 111 and the origin O and how much the coarse point 111' is displaced from the line 12. It is possible with this device to obviate inevitable disturbances and to infer correct sense of the phase error $\theta_e$ despite a possible fluctuation in amplitude of the incoming modulated signal. The device is therefore most desirable insofar as simple phase modulation systems are concerned.

Figure 2:
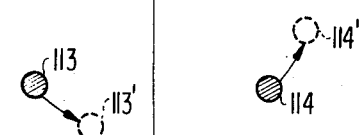
FIG. 2 again shows the X-Y plane depicted in FIG. 1 for describing those principles of phase error detection on which the present invention is based.
Figure 2:
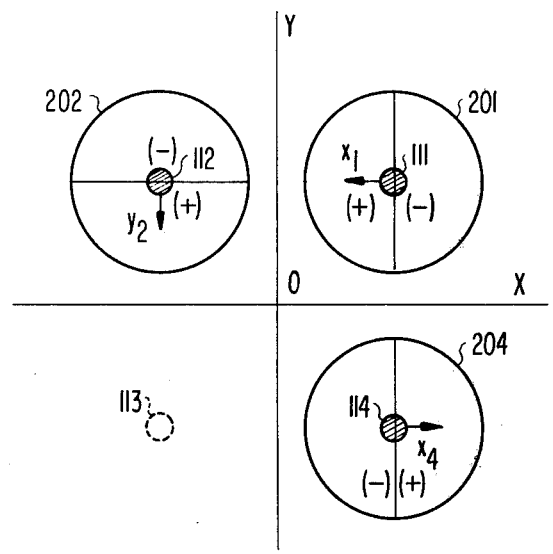

Referring now to FIG. 2, principles based on which the present invention operates will be described in conjunction with the four-phase modulation illustrated with reference to FIG. 1. In order to infer a phase error $\theta_e$ of a reference carrier signal reproduced in a receiver comprising the phase synchronizing device, three windows 201, 202 and 204 are provided to specify or define predetermined areas around three true signal points 111, 112 and 114, respectively, preselected from the four true points 111–114. It is assumed that any coarse signal point distributed within the window 201 or visible through the window 201 is derived from the corresponding true point 111. An X component of a difference or displacement $x_1$ from the true point 111 and a coarse point viewed through the pertinent window 201 is a piece of information for deducing the phase error $\theta_e$. Likewise, a Y component and another X component $y_2$ and $x_4$ for any coarse points seen through the relevant windows 202 and 204 are also information pieces for inferring the phase error $\theta_e$. If the incoming modulated signal is kept at a constant level, the sign (plus or minus) of the respective difference components $x_1$, $y_2$ and $x_4$ coincide with the sign of the phase error $\theta_e$. The sign of the phase error $\theta_e$ is more important in phase synchronization than the absolute value thereof. Based on the sign, the reproduced carrier signal is phase synchronized towards a zero phase error. If the incoming modulated signal is subjected either to variation in amplitude or to a stationary dislocation or offset in the X and Y axes it becomes impossible even to guess the sign of the phase error $\theta_e$ from the difference components $x_1$, $y_2$ and $x_4$. It is, however, feasible even in such a case to safely and accurately carry out the phase synchronization by somehow simultaneously controlling the amplitude and offset. For example, it is possible to simultaneously carry out the amplitude and offset control in the direction of the X axis by the components $x_1$ and $x_4$, respectively. Inasmuch as the details of this kind of control is described in the above-referenced Furuya et al article, pages 92 and 96 (FIG. 4), it will be presumed in the following that the amplitude variation and offset are already removed.

Figure 3:
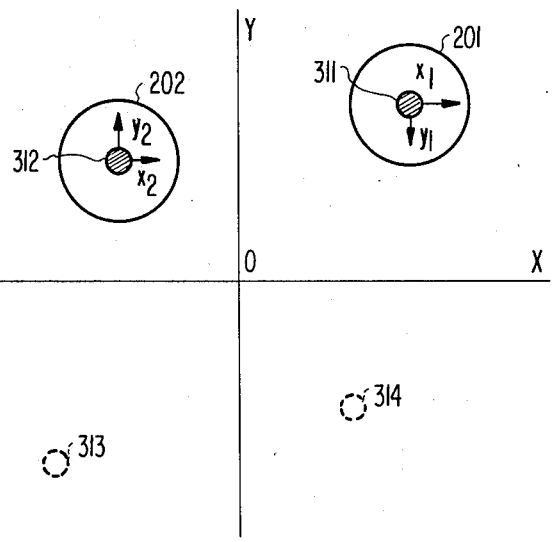
FIG. 3 shows an X-Y complex amplitude plane for illustrating the principles of phase error detection for a phase synchronizing device according to one embodiment of this invention.

Turning to FIG. 3, principles of phase synchronization for a phase synchronizing device according to one embodiment of this invention will be described in conjunction with more general amplitude and phase modulation. The depicted X-Y plane is an orthogonal X-Y complex amplitude plane of an incoming amplitude and phase modulated signal at a receiver comprising the phase synchronizing device. First through fourth true signal points 311, 312, 313 and 314 having coordinates ($X_i$, $Y_i$), where $i$ represents 1 through 4 for the illustrated example, are predetermined on the X-Y plane for codes being transmitted and received at the receiver as the incoming modulated signal. As described hereinabove, the true points ($X_i$, $Y_i$) are undesirably shifted to coarse signal points ($X_i'$, $Y_i'$), not shown, so long as a reference carrier signal reproduced in the receiver has a phase error $\theta_e$ with respect to an incoming reference carrier signal implicitly included in the incoming modulated signal to define the depicted X-Y plane. For a phase synchronizing device according to the second embodiment, first and second windows 201 and 202 are provided around the first and second true points 311 and 312. Inasmuch as these points 311 and 312 are preselected and not necessarily equal in number to the true points 311–314, the coordinates of the preselected true points may be written as ($X_j$, $Y_j$) where $j$ is now representative of 1 and 2. The sign of the phase error $\theta_e$ may be given by first X and Y displacement components ($x_1$, $y_1$) of a coarse signal point visible through the first window 201 relative to the first true point 311. The sign may be provided also by second X and Y components ($x_2$, $y_2$) of a displacement from the second true point 312 of a coarse signal point seen through the second window 202.

Figure 4:
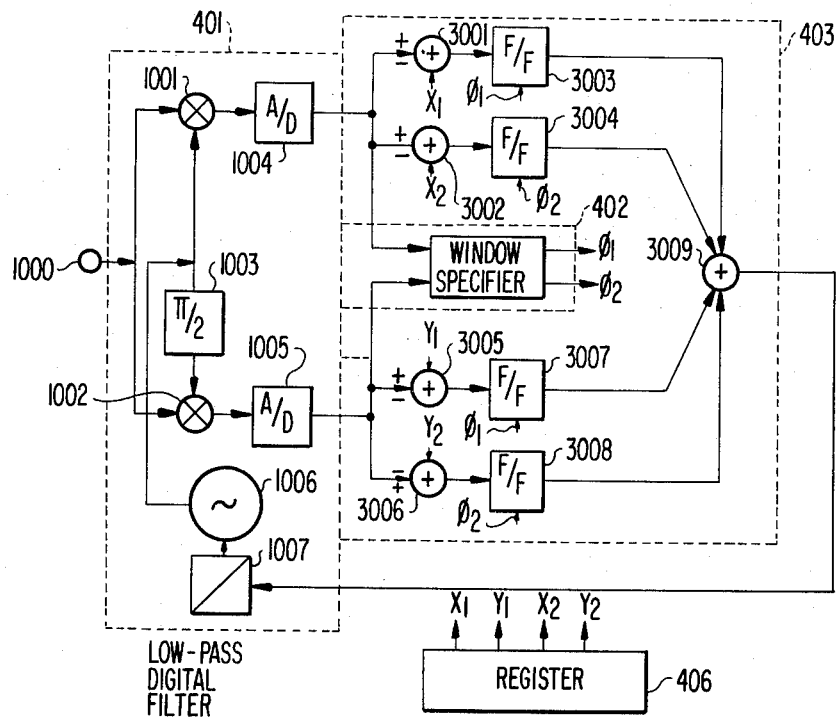
FIG. 4 is a block diagram of a phase synchronizing device according to the embodiment.

Referring to FIG. 3 once again and to FIG. 4 afresh, a phase synchronizing device according to the embodiment of this invention is for use in the receiver mentioned in the next preceding paragraph and comprises a demodulator unit 401, a window specifier 402, and a control signal generator 403. The phase synchronizing device further comprises a register or the like 406 for producing first and second X and Y standard point signals $X_j$ and $Y_j$ representative of preselected true signal points ($X_j$, $Y_j$) which are preliminarily known from the modulation resorted to and for which first windows 201 and 202 of predetermined areas are provided. An incoming amplitude and phase modulated signal supplied to an input terminal 1000 of the phase synchronizing device is supplied to a quadrature phase and amplitude demodulator contained in the demodulator unit 401 and comprising X and Y mixers 1001 and 1002 and a phase shifter 1003 to become X and Y complex signals, which are delivered to X and Y analog-to-digital converters 1004 and 1005. In order to reproduce or recover a reference carrier signal for the quadrature phase and amplitude demodulation, the illustrated demodulator unit 401 comprises a digital-code controlled oscillator 1006 and a low-pass digital filter 1007 to be described later again. So long as the reproduced carrier signal has a phase error $\theta_e$ with respect to an incoming reference carrier signal implicitly included in the incoming modulated signal, the complex signals are selectively representative of coarse signal points ($X_i'$, $Y_i'$), now shown. Responsive in principle to such complex signals, the window specifier 402 produces first and second window signals $\phi_1$ and $\phi_2$, which may become binary "1" or "0" signals according as the complex signals are representative of points distributed within the predetermined areas of the windows 201 and 202 and outside thereof, respectively.

Figure 5:
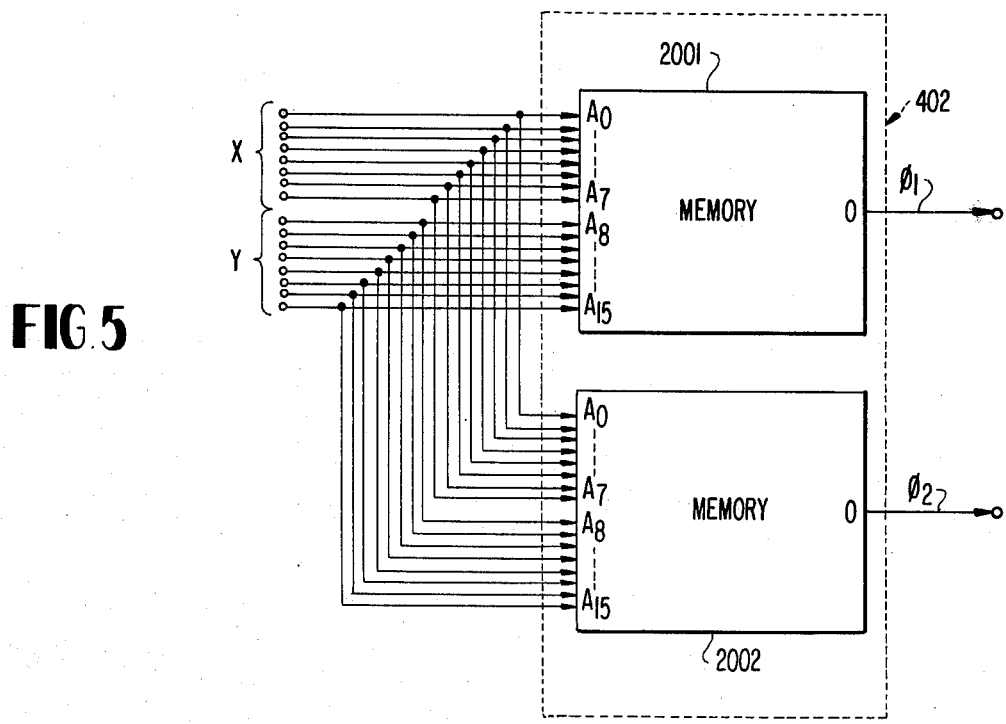
FIG. 5 is a block diagram of a window specifier for use in the device illustrated in FIG. 4.

Referring temporarily to FIG. 5, it is pointed out at first that the X and Y complex signals are quantized by the X and y analog-to-digital converters 1004 and 1005 (FIG. 4) into X and Y digital code signals. Let each of the converters 1004 and 1005 be an eight-bit analog-to-digital converter. The window specifier 402 comprises first and second read-only memories 2001 and 2002, each having sixteen-bit addresses $A_0, \ldots, A_7, A_8, \ldots,$ and $A_{15}$ (eight bits for each of the X and Y digital code signals). The first memory 2001 is loaded with binary "1" signals at addresses corresponding to the first window 201 to make the first window signal $\phi_1$ of one bit assume a binary "1" or a binary "0" value according as the X and Y digital code signals represent the values predetermined for the first window 201. The second memory 2002 is similar both in structure and operation. It is to be noted that the coarse point around which a window is provided is determined by the values of the X and Y digital code signals supplied to the read-only memory 2001 or 2002 and that the predetermined area is decided by the addresses at which the memory 2001 or 2002 is loaded with the binary "1" signals. While the window signals $\phi_1$ and $\phi_2$ may be produced by the illustrated window specifier 402, these signals may alternatively be provided by desired ones of the output signals of a signal detection circuit in a receiver of the type known in the art. In this event, the detection circuit and means for selecting the at least one desired output signal should be deemed as a window specifier.

Turning back to FIGS. 3 and 4, the X digital code signal is supplied to first and second X subtractors 3001 and 3002 for subtracting therefrom the first and second X standard point signals $X_1$ and $X_2$ to deliver first and second X difference signals to first and second X data-latch circuits 3003 and 3004, each of which may be a D-type flip-flop and to which the first and second window signals $\phi_1$ and $\phi_2$ are supplied as read-in pulses. The first and second X difference signals are representative of first and second X components $x_1$ and $x_2$ of displacements of the coarse points $(X_j', Y_j')$ from the corresponding true points $(X_j, Y_j)$ before achievement of the phase synchronization and memorized by the respective data-latch circuits 3003 and 3004 until a coarse signal point appears again in the pertinent one of the first and second windows 201 and 202 to produce first and second binary "1" window signals and thereby to energize the respective data-latch circuits 3003 and 3004. For example, let the first X standard point signal $X_1$ and the X digital code signal for a coarse signal point corresponding to the first true point 311 represent binary 01011010 (decimal 90) and 01011100 (decimal 92), respectively. The first X difference signal $x_1$ represents binary 00000010 (decimal 2) and retained in the first X data-latch circuit 3003 until another coarse signal point appears in the first window 201. Similarly, the Y digital code signal is supplied to first and second y subtractors 3005 and 3006 and thereafter to first and second Y data-latch circuits 3007 and 3008. It is to be noted here that the first Y subtractor 3005 subtracts the first Y digital code signal from the first Y standard point signal $Y_1$ so that the difference signals produced by the subtractors 3001, 3002, 3005 and 3006 may represent differences of the same sign for a certain phase error $\phi_e$.

Further referring to FIG. 4, the control signal generator 403 comprises an adder 3009 for calculating a linear sum $\{(x_1 + x_2) + (y_1 + y_2)\}$ of the first and second X and Y difference signals to produce a sum or control signal representative of the linear sum. After passing through the low-pass digital filter 1007, the control signal controls the oscillator 1006 composed of a digital-to-analog converter and a voltage-controlled oscillator VCO (both not shown) so as to reduce the phase error $\theta_e$ toward zero in the known manner. The low-pass digital filter 1007 may be one described by C. M. Rader et al in detail in "Digital Filter Design Techniques in the Frequency Domain", published in *Proceedings of the IEEE*, Vol. 55, No. 2 (February 1967), pages 149–171. With such a circuit arrangement, the control signal is converted into an analog control signal by the digital-to-analog converter involved in the oscillator 1006 with a result that the frequency of oscillation of the VCO may be changed to reduce the phase error $\theta_e$ toward zero. As mentioned hereinabove, use may be made of at least one window, $n$ in number in general where $n$ represents the number of the preselected true signal points $(X_j, Y_j)$ and is consequently not greater than N, and of X difference signals, $p$ in number, and Y difference signals, $q$ in number, where $p$ and $q$ are not greater than $n$ and not simultaneously equal to zero.

In addition, each single signal line forming the interconnection between the analog-to-digital converters 1004 and 1005 and the adder 3009 and between those converters and the window specifier 402 consists of eight signal lines for handling the eight-bit parallel input or output signal. Therefore, the subtractors 3001, 3002, 3005 and 3006 perform the subtraction operation of the eight-bit parrallel input by the parallel use of two 4-bit binary full adders each consisting of that shown on page S-115 of "Supplement to the TTL Data Book for Design Engineers" published in 1974 by TEXAS INSTRUMENTS INCORPORATED. Also, each of the data-latch circuits 3003, 3004, 3007 and 3008 is composed of the eight D-type flip-flops using two 4-bit bistable laches in parallel each consisting of that shown on page S-109 of the TTL Data Book. Similarly, the adder for obtaining the linear sum $\{(x_1 + x_2) + (y_1 + y_2)\}$ can be easily designed by the combination of the parallel and serial use of the six 4-bit binary full adders of the TTL Data Book.

What is claimed is:

1. For use in a receiver for an incoming amplitude and phase modulated signal selectively representative of true signal points $(X_j, Y_j)$, N in number, arranged on an X-Y complex amplitude plane, a phase synchronizing device for phase synchronizing a reproduced reference carrier signal with an incoming reference carrier signal defining said X-Y plane and contained implicity in said incoming modulated signal, comprising:

a demodulator responsive to said incoming modulated signal and said reproduced carrier signal for producing complex signals selectively representative of coarse signal points $(x_i', Y_i')$ distributed on said X-Y plane around said true points, a window specifier responsive to said complex signals for producing window signals defining predetermined areas on said X-Y plane which include predetermined ones, $n$ in number, of said true points, $n$ being not greater than N, means responsive to said complex signals and said window signals for producing difference signals representative of differences $(x_j, y_j)$ in X and Y components between said true points and the coarse points included in said areas, means for calculating a linear sum of the differences, $p$ in number, in the X components and the differences, $q$ in number, in the Y components to produce a sum signal representative of said sum, $p$ and $q$ being not greater than $n$ and not simultaneously equal to zero, and means responsive to said sum signal for phase controlling said reproduced carrier signal.

2. A phase synchronizing device as recited in claim 1 wherein said demodulator comprises:
   first and second mixers connected to receive said incoming amplitude and phase modulated signal,
   a voltage controlled oscillator connected to supply reference signals in quadrature to said first and second mixers and responsive to said means for phase controlling, and
   first and second analog-to-digital converters connected to the outputs of said first and second mixers, respectively, for generating digital codes representative of said coarse signal points $(X_i', Y_i')$, said window specifier and means for producing difference signals being responsive to said digital codes.

3. A phase synchronizing device as recited in claim 2 wherein said window specifier comprises at least one read only memory and said digital codes comprise the address for said read only memory.

4. A phase synchronizing device as recited in claim 2 wherein said means for producing difference signals comprises:
   means for storing digital codes representative of said true signal points $(X_i, Y_i)$,
   at least first and second subtractors connected to receive the X digital codes $(X_i)$ and $(X_i')$ and the Y digital codes $(Y_i)$ and $(Y_i')$, respectively, to produce said difference signals $(x_j, y_j)$, and
   memory means responsive to said window signals for storing said difference signals when said coarse signal points $(X_i', Y_i')$ fall within said predetermined areas on said X-Y plane.

5. A phase synchronizing device as recited in claim 2 wherein said linear sum of differences is a digital signal and said means for phase controlling is a low-pass digital filter producing a control voltage for said voltage controlled oscillator.

* * * * *

UNITED STATES PATENT AND TRADEMARK OFFICE
CERTIFICATE OF CORRECTION

PATENT NO. : 4,057,762
DATED : November 8, 1977
INVENTOR(S) : Junji NAMIKI

It is certified that error appears in the above-identified patent and that said Letters Patent are hereby corrected as shown below:

Column 1, line 63 - after "FIG. 4" delete "on" insert -- of --
Column 2, line 31 - delete "difference" insert -- differences --
Column 4, line 20 - after "displacement" insert -- or difference --
          line 55 - delete "now" insert -- not --
          line 65 - delete "y" insert -- Y --
Column 5, line 50 - after "second" delete "y" insert -- Y --
          line 57 - delete "$\phi_e$" insert -- $\Theta_e$ --

Column 6, line 49 - delete "$x_i'$" insert -- $X_i'$ --

Signed and Sealed this

Twenty-eighth Day of March 1978

[SEAL]

Attest:

RUTH C. MASON
*Attesting Officer*

LUTRELLE F. PARKER
*Acting Commissioner of Patents and Trademarks*